United States Patent [19]
Wilson

[11] Patent Number: 5,902,341
[45] Date of Patent: May 11, 1999

[54] METHOD AND APPARATUS TO AUTOMATICALLY GENERATE A TRAIN MANIFEST

[75] Inventor: John Bryan Wilson, Lawrenceville, Ga.

[73] Assignee: Scientific-Atlanta, Inc., Norcross, Ga.

[21] Appl. No.: 08/741,250

[22] Filed: Oct. 30, 1996

[51] Int. Cl.⁶ .............................. G06F 17/00; G06F 7/00
[52] U.S. Cl. ................... 701/19; 246/122 R; 246/167 R; 246/169 R; 340/825.49; 342/357; 342/457
[58] Field of Search .................. 701/19, 20; 246/122 R, 246/124, 167 R, 6, 3, 169 R; 340/825.49, 825.54, 988, 989; 342/357, 457

[56] References Cited

U.S. PATENT DOCUMENTS

| | | |
|---|---|---|
| 3,703,722 | 11/1972 | Gershberg et al. . |
| 3,728,721 | 4/1973 | Lee et al. . |
| 3,790,780 | 2/1974 | Helmcke et al. . |
| 4,104,630 | 8/1978 | Chasek ................................ 343/6.5 R |
| 4,741,245 | 5/1988 | Malone . |
| 4,896,580 | 1/1990 | Rudnicki ............................. 89/1.815 |
| 4,937,581 | 6/1990 | Baldwin et al. . |
| 5,025,253 | 6/1991 | DiLullo et al. . |
| 5,039,038 | 8/1991 | Nichols et al. . |
| 5,129,605 | 7/1992 | Burns et al. . |
| 5,142,278 | 8/1992 | Moallemi et al. . |
| 5,223,844 | 6/1993 | Mansell et al. . |
| 5,310,134 | 5/1994 | Hsu et al. . |
| 5,317,321 | 5/1994 | Sass . |
| 5,351,919 | 10/1994 | Martin . |
| 5,404,465 | 4/1995 | Novakovich et al. . |
| 5,420,883 | 5/1995 | Swensen et al. . |
| 5,450,329 | 9/1995 | Tanner . |
| 5,453,740 | 9/1995 | Gallagher et al. . |
| 5,493,694 | 2/1996 | Vlcek et al. . |
| 5,512,902 | 4/1996 | Guthrie et al. . |
| 5,515,043 | 5/1996 | Berard et al. . |
| 5,539,398 | 7/1996 | Hall et al. . |
| 5,541,845 | 7/1996 | Klein . |
| 5,624,417 | 4/1997 | Hassan et al. .......................... 345/457 |
| 5,682,139 | 10/1997 | Pradeep et al. ......................... 340/539 |
| 5,740,547 | 4/1998 | Kull et al. ................................. 701/19 |

Primary Examiner—William A. Cuchlinski, Jr.
Assistant Examiner—Tim Wyckoff
Attorney, Agent, or Firm—Kenneth M. Massaroni; Hubert J. Barnhardt, III; Kelly A. Gardner

[57] ABSTRACT

A system located in a region to determine information about an unknown car relative to a moving train includes first and second satellite navigation receivers, first and second transceivers and first and second controllers. The moving train includes a first car, and the region includes the moving train and the unknown car. The region is defined by points at which radio communication with the first car is possible. The first satellite navigation receiver, located in the first car, provides first location data, and the second satellite navigation receiver, located in the unknown car, provides second location data. The first transceiver is located in the first car, and the second transceiver is located in the unknown car. The first controller, located in the first car, reads the first location data from the first satellite receiver at a first time and sends via the first transceiver a first request to the second transceiver at the first time. The second controller, located in the unknown car and responsive to the first request received via the second transceiver, reads the second location data from the second satellite receiver and sends via the second transceiver a first response to the first transceiver, the first response including the second location data, wherein the first controller receives via the first transceiver the response and calculates a first distance from a first difference between the first and second location data. Alternatively, the first controller polls the region for unknown cars. An unknown car responds with it identification number. The first controller has a Doppler receiver to determine whether the unknown and responding car is moving with respect to the first controller. From the Doppler indications of all responding cars, the first controller determines a train manifest, and then transmits the manifest and equipment status via satellite to a central station.

12 Claims, 3 Drawing Sheets

METHOD AND APPARATUS TO AUTOMATICALLY GENERATE A TRAIN MANIFEST

BACKGROUND OF THE INVENTION

1. Field of the Invention

The present invention relates to a method and apparatus for automatically generating a train manifest. In particular, the invention relates to method to use satellite navigation receivers or Doppler radio receivers to determine whether an unknown train is a member of a moving train.

2. Description Of Related Art

This invention solves the problem that is currently being experienced in the efficient management of railcars. Railroad companies are trying to find an automated means for tracking railcars, and being able to also generate a manifest for each train automatically. In general, they are looking for some type of radio solution.

Some of the problems they run into is how does a master radio unit which is attached to the locomotive figure out in the train yard which railcars has been attached to which locomotive. If radio equipped, most railcars in the yard would respond to a poll. Once that information has been determined, how does the information get sent back to their central office.

There is apparently no known method for automatically generating a manifest for a train. The manifest is currently done by hand. There were some attempts to put bar codes on cars and read them as they entered or left a yard, but this has not worked very well.

SUMMARY OF THE INVENTION

It is an object to the present invention to automatically generate a train manifest. It is a further object of the present invention to send the automatically generated manifest to a central office.

These and other objects are achieved in a system, located in a region to determine information about an unknown car relative to a moving train, that includes first and second satellite navigation receivers, first and second transceivers and first and second controllers. The moving train includes a first car, and the region includes the moving train and the unknown car. The region is defined by points at which radio communication with the first car is possible. The first satellite navigation receiver, located in the first car, provides first location data, and the second satellite navigation receiver, located in the unknown car, provides second location data. The first transceiver is located in the first car, and the second transceiver is located in the unknown car. The first controller, located in the first car, reads the first location data from the first satellite receiver at a first time and sends via the first transceiver a first request to the second transceiver at the first time. The second controller, located in the unknown car and responsive to the first request received via the second transceiver, reads the second location data from the second satellite receiver and sends via the second transceiver a first response to the first transceiver, the first response including the second location data, wherein the first controller receives via the first transceiver the response and calculates a first distance from a first difference between the first and second location data.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
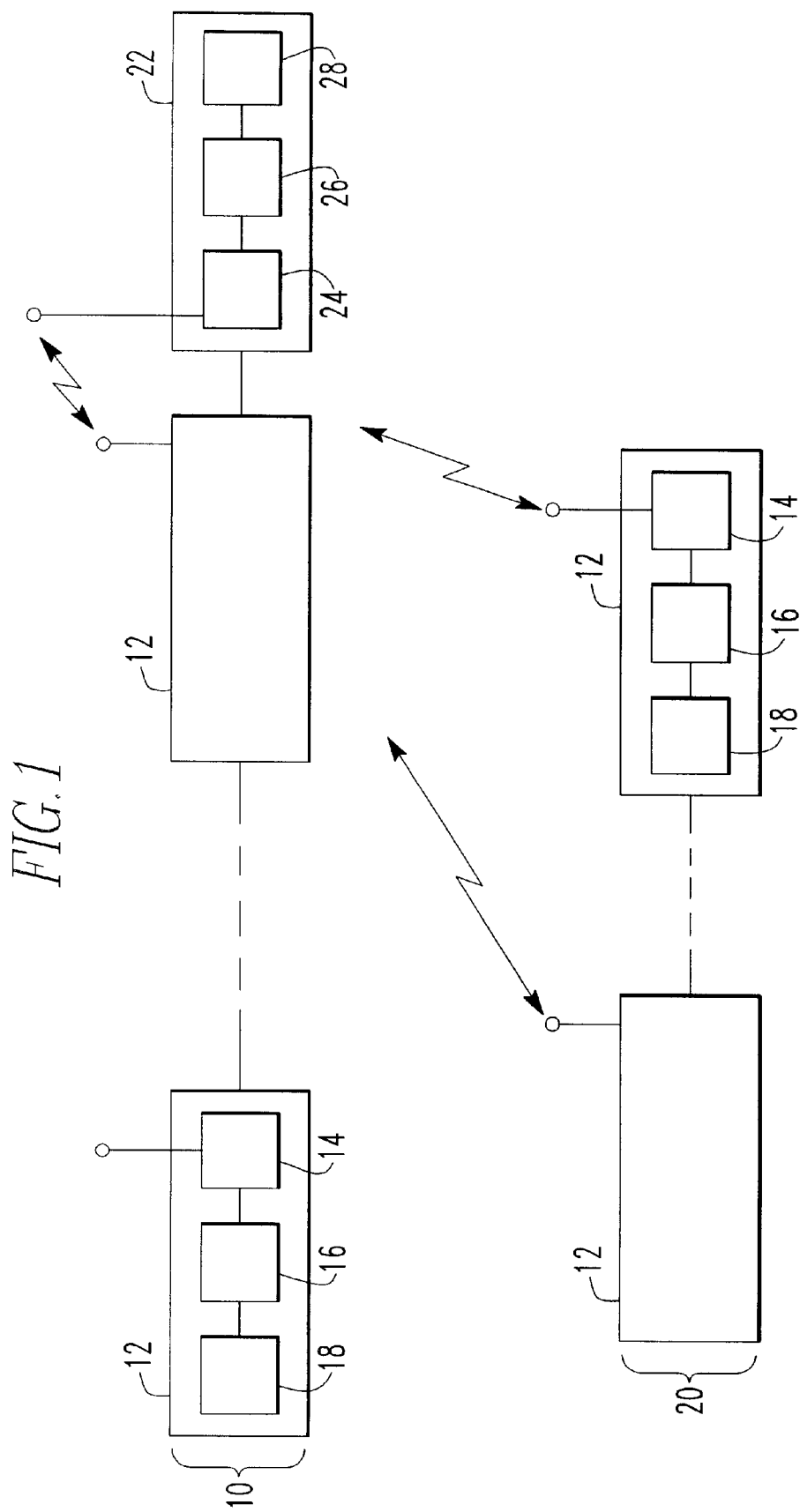
FIG. 1 is a functional block diagram depicting a first embodiment of the invention.

In a first method, a radio is attached to each railcar which contains a GPS (Global Positioning System) receiver. To poll the railcars and determine connectivity, the locomotive needs to be moving. Once the locomotive is moving it sends out a poll requesting all radios that hear its request report back its identification number and location. The master radio stores this information into a memory, and then calculates the distance from the master radio to each of the reporting railcars. After some delay, the master receiver again sends out a poll requesting everyone to report. Again, all radios hearing the poll will transmit its identification and location. The master unit again computes distance from the locomotive. The radio then compares the two list and keeps the railcar identifications for the radios where the distance has not significantly changed (there would have to be some error greater than 0 used as a threshold to take into account GPS accuracy and curved tracks, etc.). If a railcar was not attached to the locomotive in question its distance would continue to grow and could be assumed not connected to the train. If it is deemed required, this process could be repeated, for example, three times for greater confidence. Alternatively, one could calculate the change in location for each railcar and keep those that have moved the same amount.

In a second method, the train must also be in motion. In this method, however, the master radio is equipped with circuitry that allows it to determine doppler shifts in received frequencies. Once the train is in motion, the master radio will transmit a poll requesting a response. In this case, the radios will send back only its identification number, but because the train is moving, all radios that are not attached to that locomotive will appear to be in motion relative to the master radio, and as a result, the responding signal will contain a Doppler shift on its carrier frequency. All cars that are attached to the locomotive will appear to be stationary and will therefore not have any Doppler shift present. A receiver designed to detect Doppler shifts can then filter out all radios responding with a frequency shift and only keep the units that appear to be stationary. There are many descriptions of Doppler receivers used in radar applications that could be used here.

The specific type of radio used to communicate to the railcars could be done by a number of different means. A different radio would be most likely used for sending back the generated data to the central office. Because the trains traverse a variety of landscapes (i.e. urban, rural, desolate), erecting a terrestrial system or using cellular telephone transmission would not always give sufficient coverage. For that reason sending back a train manifest and locations is achieved using the LLEO (Little Low Earth Orbit) satellite network. Because of the nature of satellites, there is global coverage. Other satellites could be used as well, for example, a geo-synchronous satellite could be used for large regional coverage. This would always assure that the signals would be available for transmission. The system could also be used for messaging or sending back equipment status (fuel efficiency, speed, bearing status, etc.) to the central office. The hardware includes a dual mode master radio that has a low power transmitter/receiver that communicates to the railcars and a satellite (LLEO) transceiver that sends and receives data to and from the satellite. This receiver preferably includes a GPS receiver to report the location of the entire train.

In FIG. 1, moving train 10 includes first car 22 and one or more additional cars 12. Additional cars 12 have a radio system that includes GPS receiver 18, controller 16 and transceiver 14. First car 22 has a radio system that includes first transceiver 24, first controller 26 and GPS receiver 28. Moving train 10 travels through a region which may include one or more unconnected cars 20, the unconnected cars 20 include cars 12 similar to car 12 in the moving train. Each car 12 has a radio system that includes second transceiver 14, second controller 16 and GPS receiver 18. It will be appreciated that first controller 26 and second controller 16 may be implemented by a processor having a processing unit, a memory and an input/output unit.

In operation, the first GPS receiver provides first location data to the radio system in the first car. The second GPS receiver provides second location data to the radio system in an unknown car, for example, car 12 within moving train 10 or car 12 of the unconnected cars 20. The first controller reads the first location data from the first GPS receiver at a first time and, at the same time, sends via the first transceiver a first request to the second transceiver. The second controller, responsive to the first request received via the second transceiver, reads the second location data from the second GPS receiver and sends via the second transceiver a first response to the first transceiver. The first response includes the second location data and an identification number to identify the unknown car. The first controller receives via the first transceiver the first response and calculates a first distance from a difference between the first and second location data. Thus, it is possible to determine the distance between the first car and the unknown car.

This process is repeated at a second time. If the distance as measured at the first time and the distance as measured at the second time, is the same, it is concluded that the unknown car is connected to the first car (both moving). If the difference in distances is substantially non zero, it is concluded that the unknown car is unconnected to the moving train. Then, the train manifest and equipment status are sent to a central station as described with respect to FIG. 3.

Figure 2:
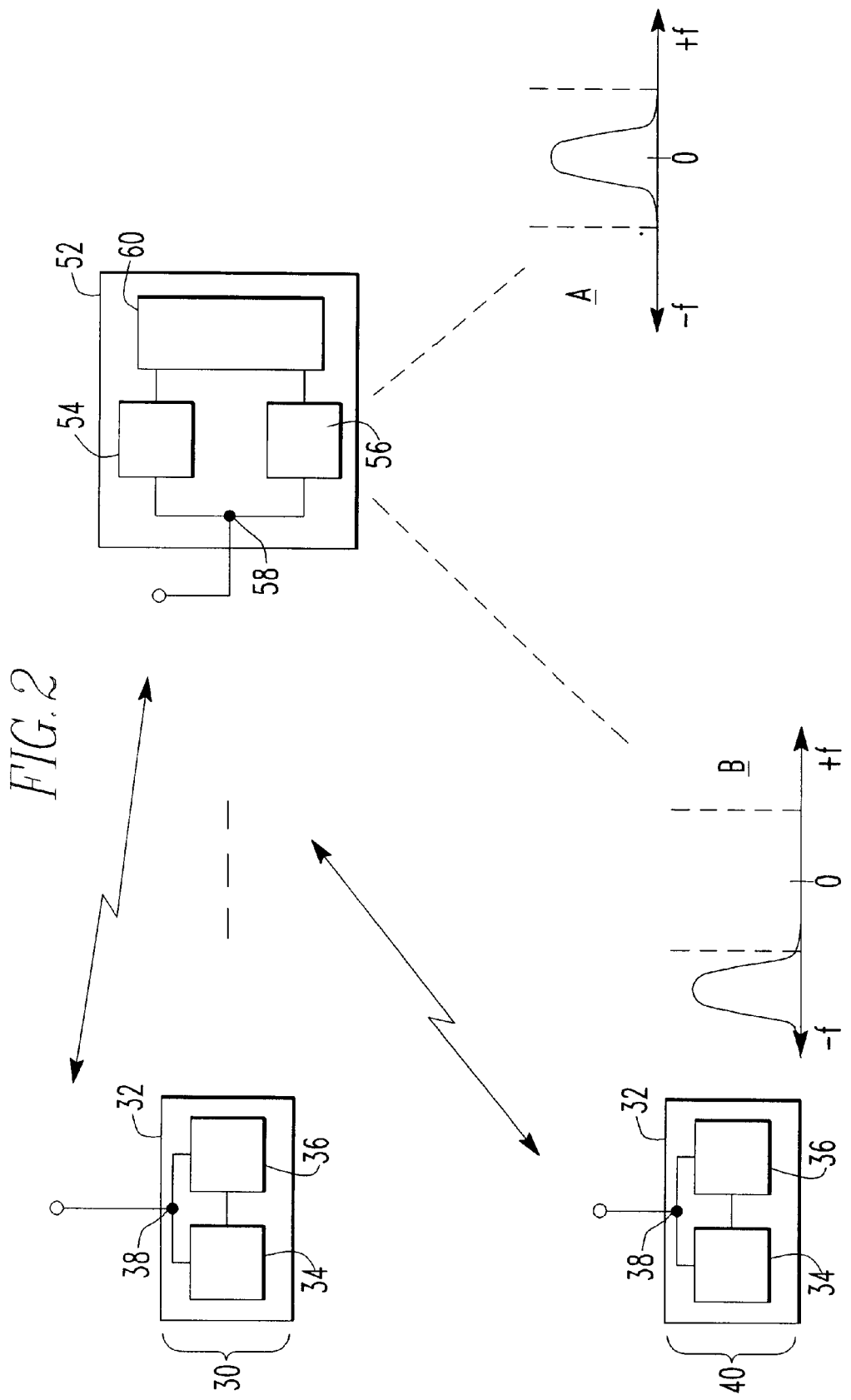
FIG. 2 is a functional block diagram depicting a second embodiment of the invention.

In FIG. 2, first car 52 includes processor/controller 60 connected to interrogation pulse transmitter 54 and Doppler receiver 56. Both transmitter 54 and receiver 56 are connected through antenna diplexer 58 to an antenna. Moving train 30 includes first car 52 and at least one additional car 32. Each additional car 32 includes receiver 34, transmitter 36 and antenna diplexer 38 connected to an antenna.

Figure 4:
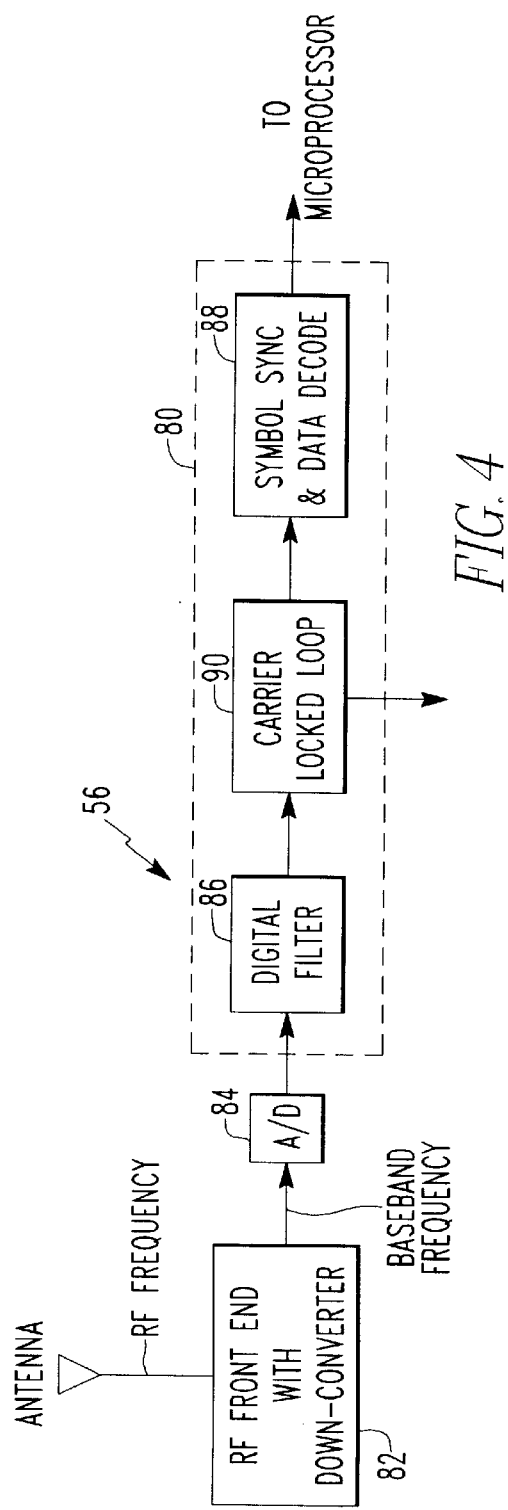
FIG. 4. is a functional block diagram depicting a Doppler receiver of the present invention.

In FIG. 4, details of Doppler receiver 56 are depicted. Doppler receiver 56 is connected to the antenna through diplexer 58 and includes front end 82 (i.e., an RF front end with down converter), analog to digital converter (ADC) 84 and signal processor 80. Signal processor 80 includes digital filter 86, carrier locked loop 90 and symbol and data decoder 88. Front end 82 receives RF signals at preferably 150 MHz (or alternatively 900 MHz, or any other convenient frequency that may be approved by government regulators of the spectrum). Front end 82 down converts (i.e., mixes) the RF signal with a local oscillator to provide a baseband signal characterized by a carrier frequency, preferably 455 kHz. Data is modulated on the carrier frequency by a phase modulation technique, preferably symmetric differentially coded binary phase shift keying (BPSK); however, other equivalent modulation techniques may be employed.

ADC 84 samples the baseband signal at a sample rate of at least twice the baseband frequency (e.g., at 1 MHz). Signal processor 80 is preferably a "pipeline" processor implemented in an application specific integrated circuit (ASIC) controlled by firmware. Digital filter 86 is a band pass anti-aliasing filter. Carrier locked loop 90 is preferably a digitally implemented phase locked loop. Decoder 88 is a phase shift keying decoder to recover the data that had been modulated on the carrier signal (e.g., 455 kHz).

Carrier locked loop 90, implementing a phase locked loop, incorporates a digital version of a controlled frequency oscillator that is controlled by a control signal. The control signal is output from carrier locked loop 90 to processor 60 as an indication of the Doppler frequency shift characterizing the RF signal received at front end 82. After down conversion in front end 82, the Doppler frequency shift characterizing the RF signal is added to (or subtracted from) the carrier frequency of the baseband signal. In order to lock in the carrier, the digital version of the controlled frequency oscillator is required to generate a frequency equal to the carrier frequency (e.g., 455 kHz) plus the Doppler frequency shift. With an adequately accurate frequency references for the carrier frequency and the down converter frequency in both cars 32 and 52 (FIG. 2), the primary cause for the frequency shift in the baseband signal is the Doppler frequency shift. Thus, the control signal that controls the frequency of the digital version of the controlled frequency oscillator indicates the Doppler frequency shift.

Furthermore, the data encoded on the carrier signal is decoded in decoder 88. The decoded data includes the identification of the responding car, for example car 32 (FIG. 2). Decoder 88 is coupled to processor 60, and processor 60 associates the Doppler frequency shift from carrier locked loop 90 with the identification of the responding car as decoded in decoder 88. From the Doppler frequency shift information, first car 52 (FIG. 2) is able to determined a manifest of connected cars.

In operation, processor 60 commands interrogation transmitter 54 (FIG. 2) to send an interrogation message through diplexer 58 to unknown car 32. The interrogation message is received via antenna diplexer 38 at receiver 34. The received message stimulates transmitter 36 to generate a response message which passes through antenna diplexer 38 and back to the antenna of first car 52. The response message is received at the antenna of first car 52, passes through antenna diplexer 58 to Doppler receiver 56. There, Doppler receiver 56 determines whether the response message has a shifted Doppler spectrum. Spectrum A depicts an unshifted Doppler spectrum of a connected car. Spectrum B depicts a shifted Doppler spectrum of an unconnected car. Unconnected cars 40 also respond to interrogation messages from first car 52. However, since moving train 30 is moving with respect to unconnected cars 40, there is a Doppler shift in all responses from unconnected cars 40. Processor 60 determines whether there has been sufficient Doppler shift to indicated that the response message is from an unconnected car. Then, the train manifest and equipment status are sent to a central station as described with respect to FIG. 3.

Figure 3:
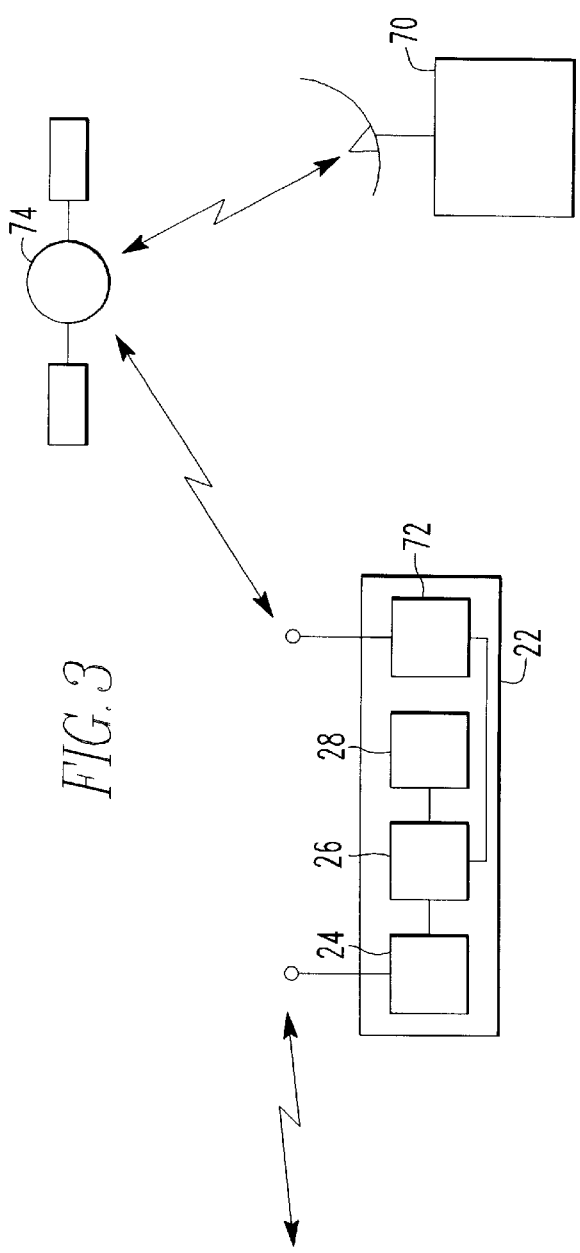
FIG. 3 is a functional block diagram depicting a third embodiment of the invention.

In FIG. 3, first car 22 (corresponding to first car 22 in FIG. 1) further includes satellite communication transceiver 72 to communicate via satellite repeater 74 with a central office 70. Satellite communication transceiver 72 is coupled to controller 26 so as to be able to report the moving train's manifest, current location and train status. It will appreciated by persons skilled in the art that the radio system that includes 24, 26 and 28 of first car 22 may be replaced by the radio system of first car 52 (FIG. 2).

Having described preferred embodiments of a novel a method and apparatus for automatically generating a train manifest (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims:

1. In a region that includes a moving train and at least one unconnected car, the moving train including a first car, the region being defined by points at which radio communication with the first car is possible, a method to determine membership of an unknown car in the moving train, the method comprising steps of:

determining a first relative position of the unknown car relative to the first car at a first time by using a satellite navigation system;

determining a second relative position of the unknown car relative to the first car at a second time by using the satellite navigation system;

calculating a displacement distance from a difference between the first relative position and the second relative position; and declaring the unknown car to be a member of the moving train when the displacement distance is substantially zero.

2. The method of claim 1, wherein the step of determining a first relative position includes:

determining at the first time a position of the first car by using the satellite navigation system;

sending at the first time a first position request from the first car to the unknown car;

determining responsive to the first position request a position of the unknown car by using the satellite navigation system;

receiving a first position response from the unknown car at the first car, the first position response including the position of the unknown car as determined in response to the first position request; and forming the first relative position by subtracting the position of the first car from the position of the unknown car.

3. The method of claim 2, wherein the step of determining a first relative position further includes:

determining at the second time a position of the first car by using the satellite navigation system;

sending at the second time a second position request from the first car to the unknown car;

determining responsive to the position request a position of the unknown car by using the satellite navigation system;

receiving a second position response from the unknown car at the first car, the second position response including the position of the unknown car as determined in response to the second position request; and forming the second relative position by subtracting the position of the first car from the position of the unknown car.

4. The method of claim 2, further including a step of sending the first position response from the unknown car to the first car so that the first position response includes an identification number corresponding to the unknown car.

5. The method of claim 1 further including a step of building a manifest, wherein:

the steps of determining first and second relative positions includes determining an identification number assigned to the unknown car; and the step of building a manifest includes (i) repeating the steps of determining first and second relative positions, calculating and declaring and (ii) listing the identification numbers of cars declared to be a member of the moving train.

6. The method of claim 5, further including a step of sending a message to a central station via a radio link, wherein the step of determining a first relative position includes determining a position of the first car at the first time, the message including the manifest and the position of the first car at the first time.

7. A system located in a region to determine information about an unknown car relative to a moving train, the moving train including a first car, the region including the moving train and the unknown car, the region being defined by points at which radio communication with the first car is possible, the system comprising:

means for determining a first relative position of the unknown car relative to the first car at a first time by using a satellite navigation system;

means for determining a second relative position of the unknown car relative to the first car at a second time by using the satellite navigation system;

means for calculating a displacement distance from a difference between the first relative position and the second relative position; and means for declaring the unknown car to be a member of the moving train when the displacement distance is substantially zero.

8. The system of claim 7, wherein the means for determining a first relative position includes:

means for determining at the first time a position of the first car by using the satellite navigation system;

means for sending at the first time a first position request from the first car to the unknown car;

means for determining responsive to the first position request a position of the unknown car by using the satellite navigation system;

means for receiving a first position response from the unknown car at the first car, the first position response including the position of the unknown car as determined in response to the first position request; and means for forming the first relative position by subtracting the position of the first car from the position of the unknown car.

9. The system of claim 8, further including means for sending the first position response from the unknown car to the first car so that the first position response includes an identification number corresponding to the unknown car.

10. The system of claim 8, wherein the means for determining a first relative position further includes:

means for determining at the second time a position of the first car by using the satellite navigation system;

means for sending at the second time a second position request from the first car to the unknown car;

means for determining responsive to the position request a position of the unknown car by using the satellite navigation system;

means for receiving a second position response from the unknown car at the first car, the second position response including the position of the unknown car as determined in response to the second position request; and means for forming the second relative position by subtracting the position of the first car from the position of the unknown car.

11. A system located in a region to determine information about an unknown car relative to a moving train, the moving train including a first car, the region including the moving train and the unknown car, the region being defined by points at which radio communication with the first car possible, the system comprising:

a first satellite navigation receiver located in the first car to provide first location data;

a second satellite navigation receiver located in the unknown car to provide second location data;

first and second transceivers, the first transceiver being located in the first car, the second transceiver being located in the unknown car;

a first controller located in the first car, the first controller reading the first location data from the first satellite receiver at a first time and sending via the first transceiver a first request to the second transceiver at the first time;

a second controller located in the unknown car, the second controller responsive to the first request received via the second transceiver reading the second location data from the second satellite receiver and sending via the second transceiver a first response to the first transceiver, the first response including the second location data, wherein the first controller receives via the first transceiver the response and calculates a first distance from a first difference between the first and second location data.

12. The system of claim 11, wherein the first controller further includes repeat circuitry, the repeat circuitry including:

a timer to define a second time after the second time;

a control element to initiate reading second location data from the first satellite receiver at the second time and sending a second request at the second time, the first controller receiving a second response and calculating a second distance; and a calculator to determine a displacement distance as a difference between the first and second distances, the calculator declaring the unknown car to be a member of the moving train when the displacement distance is substantially zero.

* * * * *